United States Patent
Aarts et al.

(10) Patent No.: US 6,411,280 B1
(45) Date of Patent: Jun. 25, 2002

(54) INPUT DEVICE GENERATING TACTUAL CUES

(75) Inventors: Jan W. Aarts, Eindhoven (NL); Marc E. C Lambrechts; Stefaan M. M. Note, both of Leuven (BE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/362,232

(22) Filed: Jul. 28, 1999

(30) Foreign Application Priority Data

Jul. 31, 1998 (EP) .............................. 98202583

(51) Int. Cl.7 ............................... G09G 5/08
(52) U.S. Cl. .................. 345/163; 345/161; 345/156
(58) Field of Search ................ 345/156, 161, 345/163, 169, 173

(56) References Cited

U.S. PATENT DOCUMENTS 5,973,689 A * 10/1999 Gallery ...................... 345/339
6,186,896 B1 * 2/2001 Takeda et al. ................ 463/38

OTHER PUBLICATIONS

IBM Technical Discl. Bulletin, vol. 32, No. 9B Feb. 1990, pp. 230–234.

* cited by examiner

Primary Examiner—Mark Zimmerman
Assistant Examiner—Mackly Monestime

(57) ABSTRACT

An input device (200) comprises a number of distinct touch areas (230, 232), i.e. areas which are normally in contact with a user while manipulating the device. At least two of such touch areas (230, 232) have corresponding tactual cue generating units (240, 242) for conveying tactual cues via the touch areas (230, 232) to the user. In an application in which the input device (200) is used, the tactual cues can convey location or direction information relating to the application, by independently operating the tactual cue generating units (240, 242).

7 Claims, 1 Drawing Sheet

INPUT DEVICE GENERATING TACTUAL CUES

BACKGROUND OF THE INVENTION

1. Field of the Invention

The invention relates to an input device comprising a touch area on an outer surface of a housing of the input device and a tactual cue generating unit for generating tactual cues in the touch area.

2. Description of the Related Art

IBM Technical Disclosure Bulletin, Vol. 32, No. 9B, Feb. 1990 discloses a mouse comprising a vibration-inducing unit. The vibration-inducing unit consists of a solenoid and a click plate. Signals from a host computer cause the solenoid to bump against the click plate, which produces a tactual click on an outer surface of the mouse.

Tactual cues are used for conveying information to the user. Tactual cues can be induced in an area on the outer surface of the input device with which the user is normally in contact while manipulating the device, such areas being termed touch areas throughout this text. In case of a mouse, the sides and the back of the housing are candidates for such touch areas. Examples of tactual cues are clicks and vibrations at various frequencies. Tactual cues can, for example, be used to: indicate movement from one window to another in a windows-oriented user interface; indicate crossing into a new cell in a spreadsheet or indicate that an illegal button was pressed. Further applications include game applications and virtual reality applications, in which the tactual cues are used, in addition to visual and auditory information, for making the user's experience more realistic.

A drawback of the known input device is that the diversity of the tactual cues that can be delivered to the user is limited.

SUMMARY OF THE INVENTION

It is an object of the invention to provide an input device as specified in the preamble, with which a larger variety of tactual cues can be generated. To this end, an input device according to the invention is characterized in that it comprises a further touch area on the outer surface and a further tactual cue generating unit for generating further tactual cues primarily in the further touch area, the further tactual cue generating unit being controllable independently of the tactual cue generating unit. With such an input device, different parts of the outer surface of the input device can be made to convey different tactual cues to the user. As a result, a whole range of new effects can be provoked. By having two sources for tactual cues, a kind of tactual stereo can be generated. In a race game application, for example, the user can be made to feel a virtual car hitting a virtual curb, and thereby distinguish between the left curb and the right curb. In general, in game applications and virtual reality applications the user can be given a more three-dimensional experience.

Thus, by independently operating the tactual cue generating units, the tactual cues can convey location or direction information relating to the application. When the input device is used for controlling an indicium on a display, the direction-dependent tactual cues can be used for guiding the user to move the indicium to a particular location on the display, or for indicating that the indicium has crossed or has bumped against a certain object on the display.

It will be understood that tactual cues generated in either touch area propagate to the other touch area due to the rigidity of the construction of the input device. In an embodiment of the present invention is based on the insight that tactual cues can nevertheless be generated primarily in either one of the touch areas and that tactual cues generated primarily in a first touch area are discernible from tactual cues generated primarily in a second touch area.

A measure for enabling the tactual cues to be generated primarily in either one of the touch areas is having the touch areas located in mutually remote parts of the input device. This reduces the amplitude of tactual cues originating from the other touch area. A further measure in accordance with the invention for achieving the same goal is providing the construction of the input device with vibration-attenuation between the touch areas.

An advantageous embodiment of the invention is that input devices to be held in both hands, as described in that claim, lend themselves particularly well for implementing the invention, because they allow the touch areas to be positioned in relatively remote parts of the input device. In another embodiment of the invention a two-hand gamepad and is particularly suited for controlling computer games. By having the tactual-cue generating units, comprising e.g. eccenter motors, being located in different handlebars of the gamepad, the tactual cue generating units are located sufficiently remotely from one another, and the user will be able to discern between tactual cues generated by either one of the tactual cue generating units.

The invention also relates to a method of providing a user of an input device with tactual cues, the method comprising the steps of transmitting a control signal to the input device and generating tactual cues in a touch area on an outer surface of the input device upon reception of the control signal by the input device. The method in accordance with the invention is characterized by generating the tactual cues primarily in the touch- area and by transmitting a further control signal to the input device and upon reception thereof by the input device generating further tactual cues primarily in a further touch area on the outer surface of the input device and independently of generating the first-mentioned tactual cues.

These and other aspects of the invention will be apparent from and elucidated with reference to the embodiments described hereinafter.

DETAILED DESCRIPTION OF THE PREFERRED EMBODIMENTS

Figure 1:
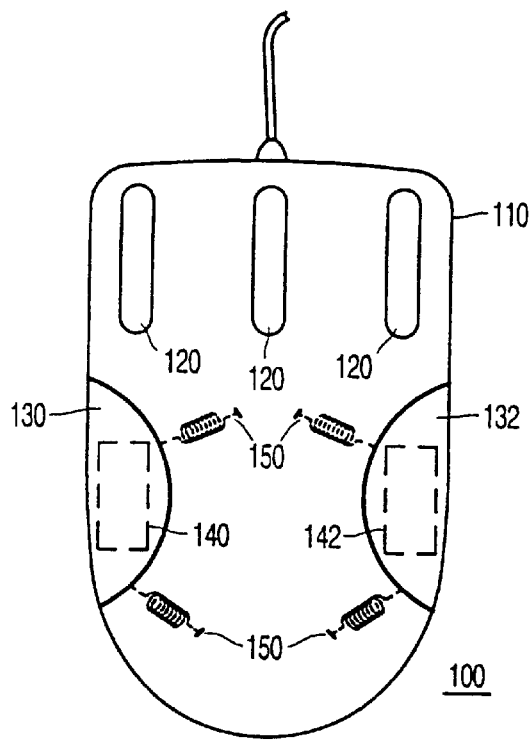
FIG. 1 shows a mouse in accordance with the invention.

FIG. 1 shows a mouse 100 in accordance with the invention. It comprises a housing 110 and three buttons 120. Furthermore, the mouse 100 has a touch area 130 on an outer surface of the housing 110 and a tactual cue generating unit 140 for generating tactual cues in the touch area 130. In accordance with an aspect of the invention, the tactual cue generating unit 140 is arranged for generating tactual cues primarily in the neighbouring touch area 130. The mouse 100 further comprises a further touch area 132 on the outer surface of the housing 110 and a further tactual cue generating unit 142 for generating further tactual cues primarily in the touch area 132.

As the touch areas 130, 132 are located in mutually remote parts of the mouse, a tactual cue generated in either one of the touch areas 130, 132 is attenuated before reaching the other one of the touch areas 130, 132. Additionally, the mouse 100 has a construction comprising separate vibration attenuation between the touch areas 130, 132. This is achieved by having the touch areas 130, 132 forming separate parts that are attached to the rest of the housing 110 via a rubber suspension 150. The touch areas 130, 132 are in direct contact with the tactual cue generating units 140, 142, whereas the rest of the housing 110 is separated from the tactual cue generating units 140, 142 via the rubber suspension 150. This clearly causes the tactual cues to be generated primarily in the touch areas 130, 132.

In accordance with the invention, the tactual cue generating unit 142 is controllable independently of the tactual cue generating unit 140. This means that an application, utilizing the mouse 100, can invoke either one of the tactual cue generating units 140, 142 to generate a tactual cue in the corresponding one of the touch areas 130, 132, without at the same time invoking the other one of the tactual cue generating units 140, 142 to generate a tactual cue in the corresponding other one of the touch areas 130, 132. The application could, for example, transmit a first control signal to the mouse 100 for invoking the tactual cue generating unit 140 to generate a tactual cue primarily in touch area 130 upon reception of the first control signal by the mouse 100, and transmit a second control signal to the mouse 100 for invoking the tactual cue generating unit 142 to generate a tactual cue primarily in touch area 132 upon reception of the second control signal.

Thus, the mouse 100 enables any application to generate various tactual effects and convey direction- or position-related information to the user by independently operating the tactual cue generating units 140, 142. Of course, the number of distinct touch areas provided with independently operable tactual cue generating units is not limited to two. If, in addition to the touch areas 130, 132, more touch areas are provided on the mouse 100, even more interesting effects can be provoked.

In a different embodiment of the invention, the tactual cue generating units of the input device could share hardware. For example, such shared hardware could comprise solenoid, being held by springs in an equilibrium position, whereas a first and a second click plate are located at either end of the solenoid which are in contact with the aforementioned touch areas. By supplying the solenoid with a current in a first direction, it bumps against the first click plate, whereas by supplying the solenoid with a current in a second direction, it bumps against the second click plate. Although with such shared hardware the tactual cue generating units interfere with each other (the solenoid can only bump against one click plate at a time), the tactual cue generating units are still controllable independently of one another in the sense that either one of them can be invoked to generate a tactual cue in the corresponding one of the touch areas, without at the same time invoking the other one of the tactual cue generating units to generate a tactual cue in the corresponding other one of the touch areas 130, 132.

Figure 2:
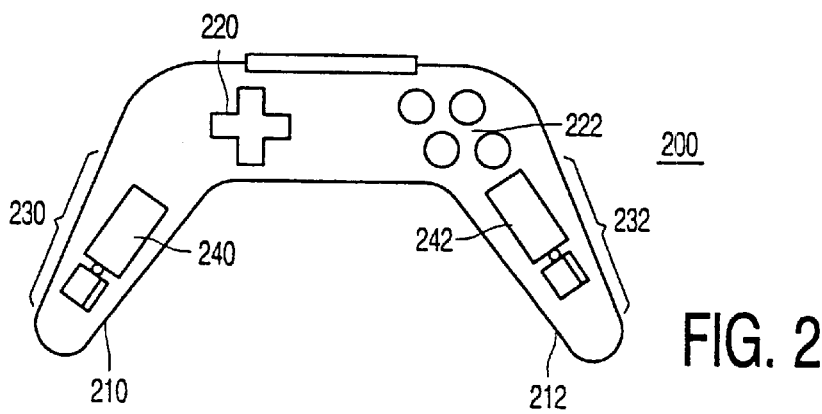
FIG. 2 shows a gamepad in accordance with the invention.

FIG. 2 shows a gamepad 200 in accordance with the invention. The gamepad 200 comprises a left handlebar 210 and a right handlebar 212. In the gamepad 200 an arrow key 220 and a set of buttons 222 is provided. The gamepad 200 further comprises a left tactual cue generating unit 240 being located in the left handlebar 210 and a right tactual cue generating unit 242 being located in the right handlebar 212. The gamepad 200 has a two-way wired or wireless connection to a data processing system, e.g. a game computer. Via this connection, the gamepad 200 provides the data processing system with input data it received from the user operating the arrow key 220 and the set of buttons 222, and the data processing system provides the tactual cue generating units 240, 242 with control signals for generating tactual cues for the user.

The shape of the gamepad is such, that it is comfortable to hold the gamepad in two hands, with handlebar 210 in the left hand and handlebar 212 in the right hand, and with the thumbs operating the arrow key 220 and the set of buttons 222. The outer surface of handlebar 210 establishes a touch area 230 and the outer surface of handlebar 212 establishes a touch area 232. Through the touch areas 230, 232 the tactual cues can be transmitted to the user. Hereto, the tactual cue generating units 240, 242 comprise eccenter motors, enabling to make the handlebars 210, 212 vibrate.

Figure 3A:
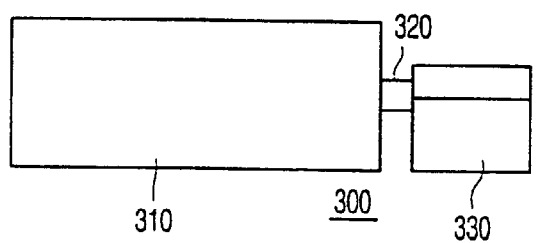
FIG. 3A is a side view of an eccenter motor as used in the gamepad of FIG. 2.
Figure 3B:
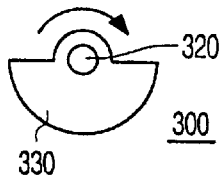
FIG. 3B is a front view of an eccenter motor as used in the gamepad of FIG. 2.

FIG. 3A is a side view and FIG. 3B is a front view of an eccenter motor 300 as used in the gamepad 200 of FIG. 2. The eccenter motor 300 comprises a motor housing 310, an axis 320 sticking out of the motor housing 310 and an eccentric load 330 fixed to the motor axis 320. Clearly, rotating the eccentric load will make the eccenter motor 300 as a whole to vibrate. Because the eccenter motor 300 is fixed directly or indirectly to the housing of the gamepad 200, vibrations of the motor 300 will be perceptible in the touch areas of the handlebars 210, 212. As can be seen from FIG. 2, the tactual cue generating units 240, 242 are positioned in the gamepad 200 remotely from one another. Therefore, the user will be able to distinguish between tactual cues generated in the left handlebar 210 and tactual cues generated in the right handlebar 212. Further measures however could be taken for preventing tactual cues to propagate from one handlebar to the other.

An embodiment of the invention similar to the gamepad 200 of FIG. 2 is a wireless keyboard, which, in contrast with the gamepad 200, comprises a keyboard and lacks the handlebars of the gamepad 200. Just like a gamepad, a wireless keyboard is, at least for some applications thereof, intended to be held in both hands and therefore is particularly suited for housing two tactual cue generating units, one at each end of the keyboard.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. In the device claims enumerating several means, several of these means can be embodied by one and the same item of hardware.

What is claimed is:

1. An input device (100;200) comprising:
    a first touch area (130;230) on an outer surface of a housing (110) of the input device (100;200); and
    a tactual cue generating means (140;240) for generating tactual cues in the first touch area (130;230),
    wherein the input device (100;200) comprises:
        a second touch area (132;232) on the outer surface that is actuated independently of said first touch area according to predetermined tactual cues; and
        a further tactual cue generating means (142;242) for generating further tactual cues in said second touch area (132;232), the further tactual cue generating means (142;242) being controllable independently of the tactual cue generating means (140;240).

2. The input device (100;200) as claimed in claim 1, wherein the tactual cue generating means (140;240) are arranged for generating said tactual cues primarily in said first touch area (130;230) and wherein the further tactual cue generating means (142;242) are arranged for generating said further tactual cues primarily in said second touch area (132, 232).

3. The input device (100;200) as claimed in claim 2, the first and second touch areas (130, 132; 230, 232) being located in mutually remote parts of the input device (100;200).

4. The input device (100;200) as claimed in claim 2, wherein the input device (100,200) has a construction comprising vibration-attenuating means (150) between the first and second touch areas (130, 132).

5. The input device (100;200) as claimed in claim 3, wherein the first touch area (230) is designed for being in contact with a user's left hand and wherein the second touch area (232) is designed for being in contact with a user's right hand during operation of the input device (200).

6. The input device (200) as claimed in claim 5, wherein the input device (200) is a gamepad (200), the gamepad (200) having a first handlebar (210) comprising the first touch area (230) and the gamepad (300) having a second handlebar (212) having a second handle bar (212) comprising the second touch area (232).

7. A method of providing a user input device (100:200) with tactual cues, the method comprising the steps of:

transmitting a control signal to the input device (100;200);

generating tactual cues in a first touch area (130;230) on an outer surface of a housing (110) of the input device (100;200) upon reception of the control signal by the input device (100;200), wherein said generating step said tactual cues primarily in said first touch area (130;230) and by the further steps of:

transmitting a further control signal to the input device (100;200); and generating further tactual cues, independently of said step of generating said tactual cues, primarily in a second touch area (132;232), which is actuated independently of said first touch area, on the outer surface upon reception of the further control signal by the input device (100;200).

* * * * *